US008812172B2

(12) United States Patent
Berkobin et al.

(10) Patent No.: US 8,812,172 B2
(45) Date of Patent: Aug. 19, 2014

(54) METHOD FOR GENERATING A VEHICLE IDENTIFIER

(75) Inventors: Eric Berkobin, Woodstock, GA (US); Alex Berkobin, Holly Springs, GA (US); Deep Kalinadhabhotla, Atlanta, GA (US)

(73) Assignee: HTI IP, LLC, Atlanta, GA (US)

(*) Notice: Subject to any disclaimer, the term of this patent is extended or adjusted under 35 U.S.C. 154(b) by 1117 days.

(21) Appl. No.: 12/559,293

(22) Filed: Sep. 14, 2009

(65) Prior Publication Data

US 2010/0070107 A1 Mar. 18, 2010

Related U.S. Application Data

(60) Provisional application No. 61/097,110, filed on Sep. 15, 2008.

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl.
USPC .......... 701/1

(58) Field of Classification Search
USPC .......... 701/1
See application file for complete search history.

(56) References Cited

U.S. PATENT DOCUMENTS

| | | | | |
|---|---|---|---|---|
| 5,491,418 | A * | 2/1996 | Alfaro et al. | 324/402 |
| 5,991,673 | A * | 11/1999 | Koopman et al. | 701/29.6 |
| 6,052,631 | A * | 4/2000 | Busch et al. | 701/29.6 |
| 6,249,228 | B1 * | 6/2001 | Shirk et al. | 340/572.4 |
| 6,370,454 | B1 * | 4/2002 | Moore | 701/29.4 |
| 6,434,455 | B1 * | 8/2002 | Snow et al. | 701/31.4 |
| 7,048,185 | B2 * | 5/2006 | Hart | 235/384 |
| 7,403,134 | B2 * | 7/2008 | Kong | 340/994 |
| 7,505,838 | B2 * | 3/2009 | Raines et al. | 701/33.4 |
| 7,739,007 | B2 * | 6/2010 | Logsdon | 701/31.5 |
| 7,894,795 | B1 * | 2/2011 | Dunne et al. | 455/406 |
| 2004/0233077 | A1 * | 11/2004 | Mizusawa | 341/87 |

* cited by examiner

*Primary Examiner* — Jason Holloway
*Assistant Examiner* — Nicholas Kiswanto

(57) ABSTRACT

Upon initial boot-up, a telematics device receives a PID map in response to a PID map request. The TCU may send multiple PID map requests for different mode and PID combinations over a vehicles communication bus, and then may append each received PID map to the already-received PID maps. The multiple PID maps appended to one another form a composite bit value, or composite PID map. The composite PID map is processed according to a hash algorithm, resulting in a pseudo-VIN. Upon subsequent boot-ups of the TCU, the TCU sends the multiple PID map requests over the vehicle's bus and generates a pseudo VIN following the same steps as it did at initial boot-up. The TCU compares the currently generated pseudo-VIN to the initial pseudo VIN; if it determines a mismatch, it sends a notification to an interested third party that indicates improper usage of the TCU.

14 Claims, 5 Drawing Sheets

METHOD FOR GENERATING A VEHICLE IDENTIFIER

CROSS REFERENCE TO RELATED APPLICATIONS

This application claims priority under 35 U.S.C. §119(e) to U.S. Provisional Patent Application No. 61/097,110 entitled "Pseudo VIN" to Berkobin, et. al, filed on Sep. 15, 2008.

BACKGROUND

Modern vehicles use 17 digit alphanumeric Vehicle Identification Numbers (VIN), which vehicle original equipment manufacturers assign, that uniquely identify each vehicle manufactured. On most late model vehicles, for example, those designed for use with a controller area network ("CAN"), J1850, KWP2000, or ISO 9141 protocols, manufacturer, dealer, maintenance, and other personnel can typically access the VIN, through the OnBoard Diagnostics II ("OBD II") port at Mode 0x09 PID 0x02 as specified by the SAE J1979 standard published by the Society of Automotive Engineers. However, many older vehicles, and even earlier generation CAN-based vehicles, do not support accessing the VIN through mode 9. Therefore, another method and means for differentiating between vehicles via the OBD II port is needed to prevent fraud, and to facilitate other activities, such as, for example, performing emissions certification testing, gleaning maintenance history, etc.

DESCRIPTION

Methods, systems, and apparatuses can utilize GPS capabilities and two-way in-vehicle data communications, typically wireless, between an in car device and a telematics operations center ("TOC"). The methods, systems, and apparatuses may enable various navigation solutions. The methods, systems, and apparatuses can comprise on-board navigation, off-board navigation, and/or a hybrid navigation approach. On-board navigation can comprise systems that store map data, location data, and can determine routing information in an apparatus installed in a vehicle or handheld. Off-board navigation can comprise systems wherein map data, location data, and routing determination capability is on a remote server, which may forward map data, location data, and determined routes toward an apparatus installed in a vehicle or handheld portable device. A hybrid navigation system can comprise systems that store map and location data on an apparatus installed in a vehicle device, or handheld device, with updates to the map and location data provided by a remote server. In a hybrid navigation system, routing can be performed on the vehicle apparatus, or at the remote server. In one aspect, an apparatus comprising a telematics control unit ("TCU") is installed in a vehicle. Such a vehicle may include, but is not limited to, personal and commercial automobiles, motorcycles, transport vehicles, watercraft, aircraft, and the like. For example, an entire fleet of a vehicle manufacturer's vehicles can be equipped with a TCU 101 shown in FIG. 1. TCU 101 can perform any of the methods disclosed herein in part and/or in their entireties.

A single box, or enclosure, may contain components of TCU 101, including a single core processing subsystem, or can comprise components distributed throughout a vehicle. Components of the apparatus can be separate subsystems of the vehicle; for example, a communications component such as a SDARS, or other satellite receiver, can be coupled with an entertainment system of the vehicle.

Figure 1:
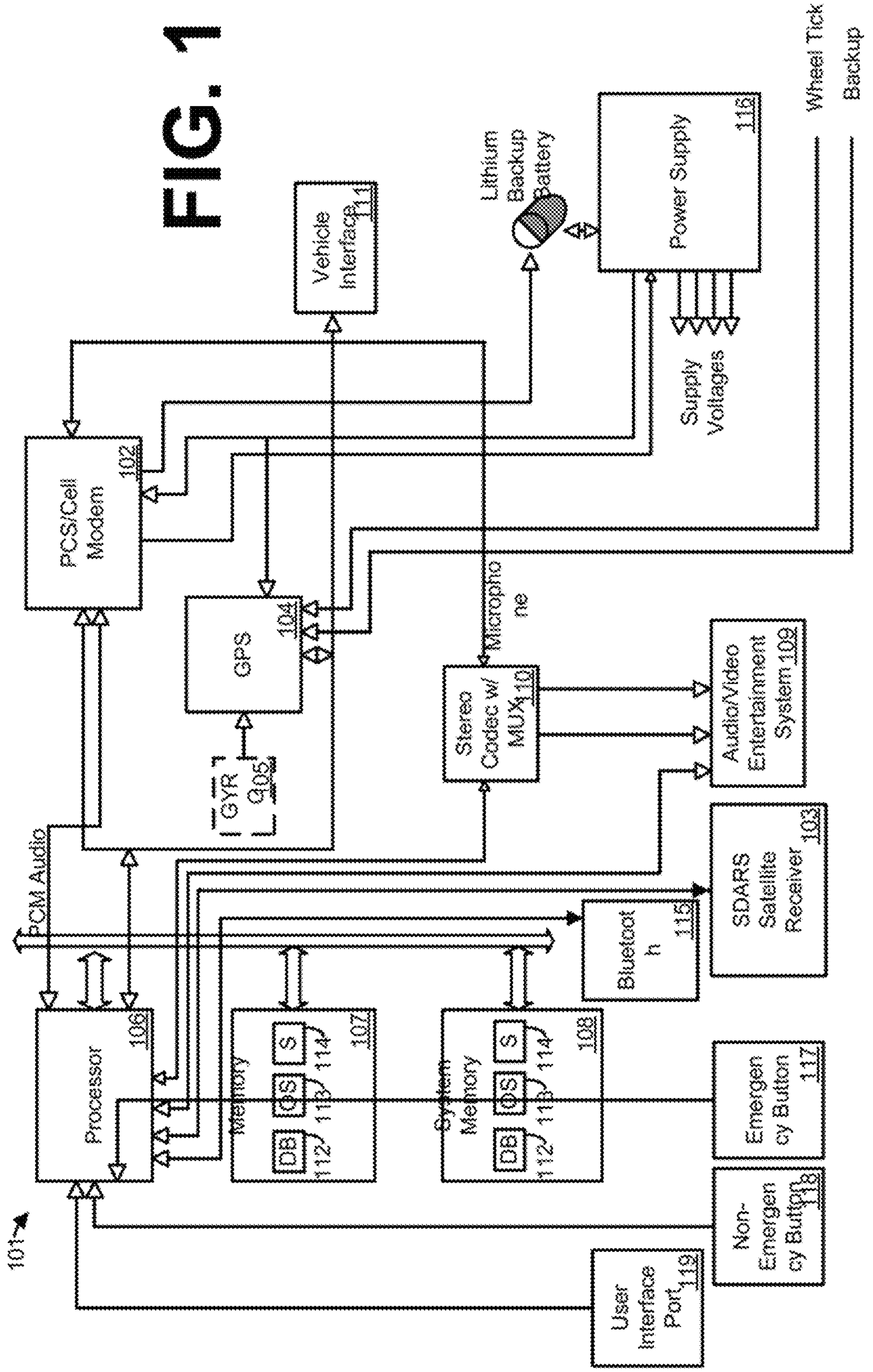
FIG. 1 Illustrates a schematic of an exemplary apparatus.

FIG. 1 illustrates an example of TCU 101, but does not suggest any limitation as to the scope of use or functionality of operating architecture. Neither should the TCU apparatus be necessarily interpreted as having any dependency or requirement relating to any one or combination of components illustrated in the exemplary apparatus. TCU apparatus 101 can comprise one or more communications components. Apparatus 101 illustrates communications components (modules) PCS/Cell modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communication can include, but is not limited to GPRS, EDGE, UMTS, 1xRTT or EV-DO. The PCS/Cell modem 102 can be a Wi-Fi or mobile WIMAX implementation that can support operation on both licensed and unlicensed wireless frequencies. Apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within, or coupled to, apparatus 101. TCU apparatus 101 can request updating, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternatively GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets, and tunnels.

In an aspect, the GPS receiver 104 can activate on vehicle crank-up, or start of vehicle motion. GPS receiver 104 can go into idle on ignition off, or after ten minutes without vehicle motion. Time to first fix can be <45 s 90% of the time. For example, this can be achieved either through chipset selection or periodic wake-up of a processor in TCU 101.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission can utilize PCS/Cell Modem 102 to transmit the data over a cellular communication network. The data can be routed through the Internet where it can be accessed, displayed and manipulated.

Processing by the disclosed systems and methods can be performed under the control of software components. The disclosed system and method can be described in the general context of computer-executable instructions, such as program modules, being executed by one or more computers or other devices. Generally, program modules comprise computer code, routines, programs, objects, components, data structures, etc. that perform particular tasks; or implement, or manipulate, particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored in memory 107, including by way of example, an operating system 113 and reporting software 114. Each of the operating system 113 and reporting software 114 (or some combination thereof) can comprise elements of the programming and the reporting software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like, or any other way, or format, for storing data and information for later retrieval. Database 112 can be centralized, or distributed across multiple systems.

In some aspects, data can be stored and transmitted in loss-less compressed form and the data can be tamper-proof. Non-limiting examples of data that can be collected follow herein. After a connection is established the protocol being used can be stored. A timestamp can be recorded on ignition for one or more trips. Speed every second during the trip. Crash events can be stored (for example, as approximated via OBD II speed). By way of example, GPS related data that can be recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

Such programs and components may reside at various times in different storage components of the apparatus 101, and may be executed by the processor 106 of apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and reporting software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

TCU apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. A cable can be used to connect the vehicle interface 111 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, and the like can be used to collect data through the vehicle interface 111. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any other data obtained from any vehicle system, subsystem, or sensor, coupled with the TCU 101, such as over bus using CAN protocol, an ISO protocol, a keyword 2000 protocol, or a similar protocol for interfacing various sensors, modules, and computers in a vehicle with each other. Additionally, CAN interfacing can eliminate individual dedicated inputs to determine, for example, brake usage, backup status, and it can allow reading of onboard sensors in certain vehicle stability control modules providing gyro outputs, steering wheel position, accelerometer forces and the like for determining driving characteristics. TCU apparatus 101 can interface directly with a vehicle subsystem or a sensor, such as, for example, an accelerometer, gyroscope, airbag deployment computer, and the like. Data obtained from, and processed data derived from, the various vehicle systems and sensors can be transmitted to a central monitoring station via the PCS/Cell Modem 102 over a communication network.

Communication with a vehicle driver can be through an infotainment (radio) head unit (not shown), or other display device (also not shown). More than one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players, and the like. Audio/video entertainment subsystem 109 can be controlled remotely through, for example, a wireless remote control, voice commands, and the like.

The methods, systems, and apparatuses disclosed herein can utilize power management techniques to ensuring that a consumer's, or motorist's, car battery is not impaired under normal operating conditions. This can include battery backup support when the vehicle is turned off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

TCU apparatus 101 can receive power from power supply 114. The power supply can have many unique features necessary for correct operation within the automotive environment. One mode is to supple a small amount of power (typically less than 100 microamps) to at least one master controller that can control all the other power buses inside of the TCU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAN activity, the processor contained within the PCS/Cellular modem 102 can control the power supply 114 to activate other functions within TCU 101, such as GPS 104/GYRO 105, Processor 106/memory 107 and 108, SDARS receiver 103, audio/video entertainment system 109, audio codec mux 110, and any other peripheral within the TCU that does not require standby power.

Processors in a TCU can have a plurality of power supply states. One state can be a state of full power and operation used when the vehicle is operating. Another state can be full power delivery from battery backup. Turning off the GPS and other non-communication related subsystem while operating on the back-up batteries can reduce backup power usage. Another state can be when the vehicle associated with TCU 101 has been shut off recently, perhaps within the last 30 days, and the TCU maintains communication over a two-way wireless network for various auxiliary services like remote door unlocking and location determination messages. After a recent shut down period, it is desirable to conserve charge in the vehicle's battery by turning off almost all power-using portions of TCU 101, except portions used to maintain system time of day clocks, and other functions waiting to be awakened on CAN activity. Additional power states are contemplated, such as a low power wakeup to check for network messages.

Normal operation can comprise, for example, the PCS/Cellular modem 102 waiting for an emergency pushbutton key-press from a user interface device, or for CAN activity. Once either is detected, the PCS/Cellular modem 102 can awaken and enable power supply 114. Similar operation can occur for a shutdown process wherein a first level shutdown process turns off everything except the PCS/Cellular modem 102, for example. The PCS/Cellular modem 102 can maintain wireless network contact during this state of operation. TCU 101 can operate normally in this state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a BlueTooth transceiver 115 that can facilitate interfacing with devices such as phones, headsets, music players, and telematics user interfaces. The apparatus can comprise one or more user inputs, such as emergency button 117 and non-emergency button 118. Emergency button 117 can be coupled to processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to processor 106. Non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted to the call center; a TOC can use this information to retrieve vehicle and motorist information, such as drug allergies or other medical issues particular to a given motorist. The voice connection permits two way voice. communications between a vehicle occupant and a call center operator. The call center operator, such as a operator working for a telematics services provider, or working for a roadside assistance operator, can provide location based services to the vehicle occupant based on the data received and the vehicle occupant's desires, as well as the needs of a service provider. For example, a button can provide a vehicle occupant with a link to roadside assistance services such as towing, spare tire changing, refueling, and the like, either directly or through an intermediary call center, such as a telematics service provider or a membership-based roadside assistance provider. In another embodiment, a button can provide a vehicle occupant with concierge-type services, such as local restaurants, their locations, and contact information; local service providers their locations, and contact information; travel related information such as flight and train schedules; and the like.

For any voice communication made through TCU 101, text-to-speech algorithms can be used so as to convey predetermined messages in addition to or in place of a vehicle occupant speaking. This allows for communication when the vehicle occupant is unable or unwilling to communicate vocally.

In an aspect, apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Figure 2:
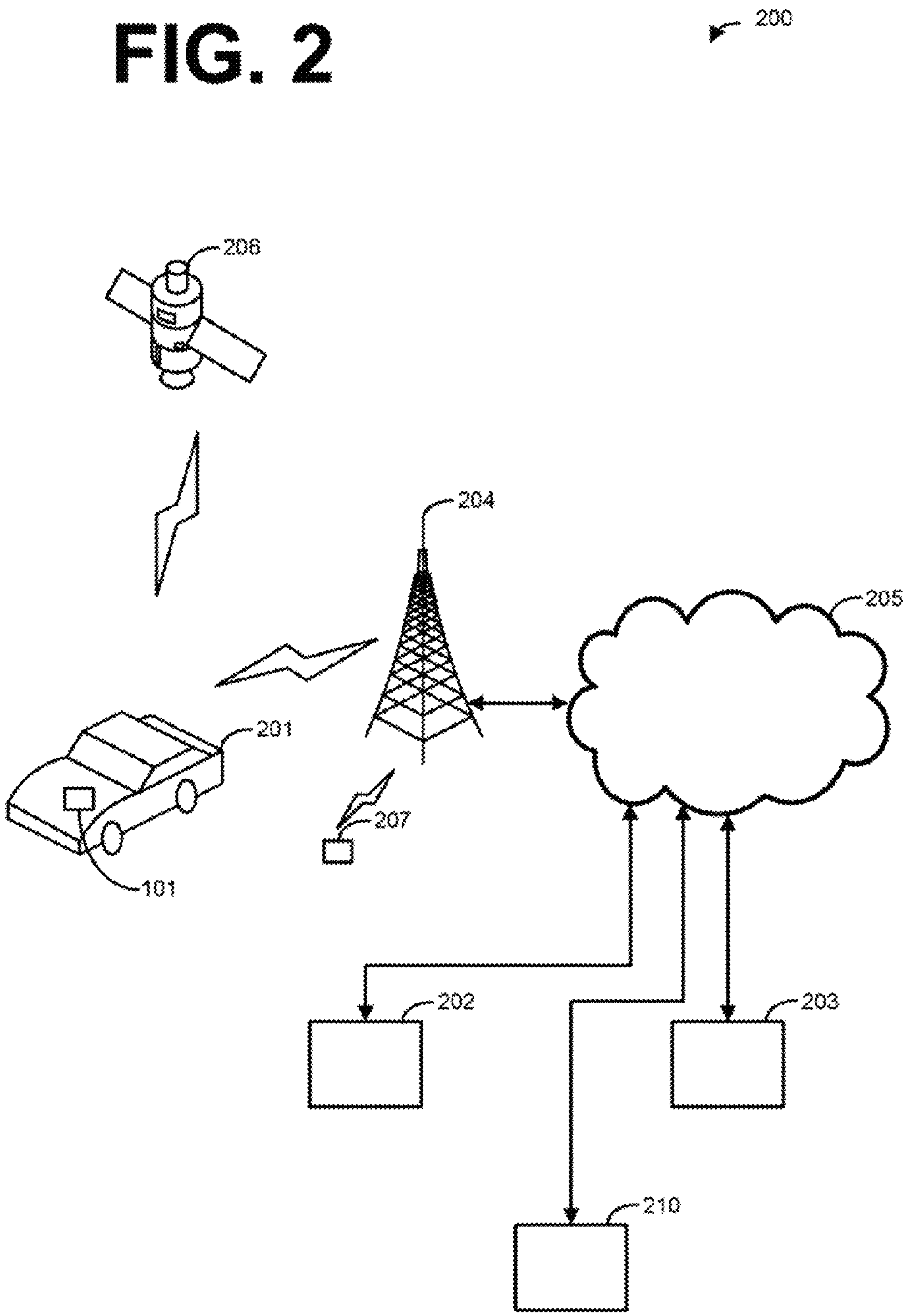
FIG. 2 Illustrates an exemplary system.

FIG. 2 is a block diagram illustrating an exemplary telematics system 200 showing network connectivity between various components. System 200 can comprise a TCU 101 located in a motor vehicle 201 and a mobile communication device 207. Mobile communication device can be a pager, a device having cellular phone circuitry, a PDA, a laptop, and the like. System 200 can comprise a central monitoring station 202. The central monitoring station 202 can serve as a market specific data gatekeeper. That is, users 203 can pull information from specific, multiple or all markets at any given time for immediate analysis. The distributed computing model has no single point of complete system failure, thus minimizing downtime of system 200. In an embodiment, central monitoring station 202 can communicate through an existing communications network (e.g., wireless towers 204 and communications network 205) with the TCU 101 and the mobile communication device 207. In another embodiment, TCU 101 can communicate directly with the mobile communication device 207. System 200 can comprise at least one satellite 206 from which GPS data are determined. These signals can be received by a GPS receiver in the vehicle 201. Station 202 can also include servers for providing telematics services, and for storing telematics-related customer and vehicle information.

System 200 can comprise a plurality of users 203 (governments, corporations, individuals, and the like) which can access the system using a computer, or other computing device, running a commercially available Web browser or client software. For simplicity, FIG. 2 shows only one user 203. Users 203 can connect to the telematics navigation system 200 via the communications network 205. In an embodiment, communications network 205 can comprise the Internet.

Telematics system 200 can comprise a central monitoring station 202 which can comprise one or more central monitoring station servers. In some aspects, one or more central monitoring station servers can serve as the "back-bone" (i.e., system processing) of system 200. One skilled in the art will appreciate that telematics system 200 can utilize servers (and databases) physically located on one or more computers and at one or more locations. Central monitoring station server can comprise software code logic that is responsible for handling tasks such as route determination, traffic analysis, map data storage, location data storage, POI data storage, data interpretations, statistics processing, data preparation and compression for output to TCU 101, and interactive route planning, location and POI searching, and the like, for output to users 203. In an embodiment, user 203 can host a server (also referred to as a remote host) that can perform similar functions as a central monitoring station server. In an embodiment of telematics system 200, central monitoring station servers and/or remote host servers, can have access to a repository database which can be a central store for a portion of or all information within telematics system 200 (e.g., executable code, map, location, POI information, subscriber information such as login names, passwords, etc., and vehicle and demographics related data).

In an aspect, central monitoring station 202 can provide updates to TCU 101 including, but not limited to, map updates, POI updates, routing software updates, and the like.

Central monitoring station servers and/or a remote host server can also provide a "front-end" for telematics system 200. That is, a central monitoring station server can comprise a web server for providing a web site which sends out web pages in response to requests from remote browsers (i.e., users 203, or customers of users 203). More specifically, a central monitoring station server and/or a remote host server can provide a graphical user interface (GUI) “front-end” to users 203 of the telematics navigation system 200 in the form of Web pages. These Web pages, when sent to the user PC (or the like), can result in GUI screens being displayed.

Figure 3:
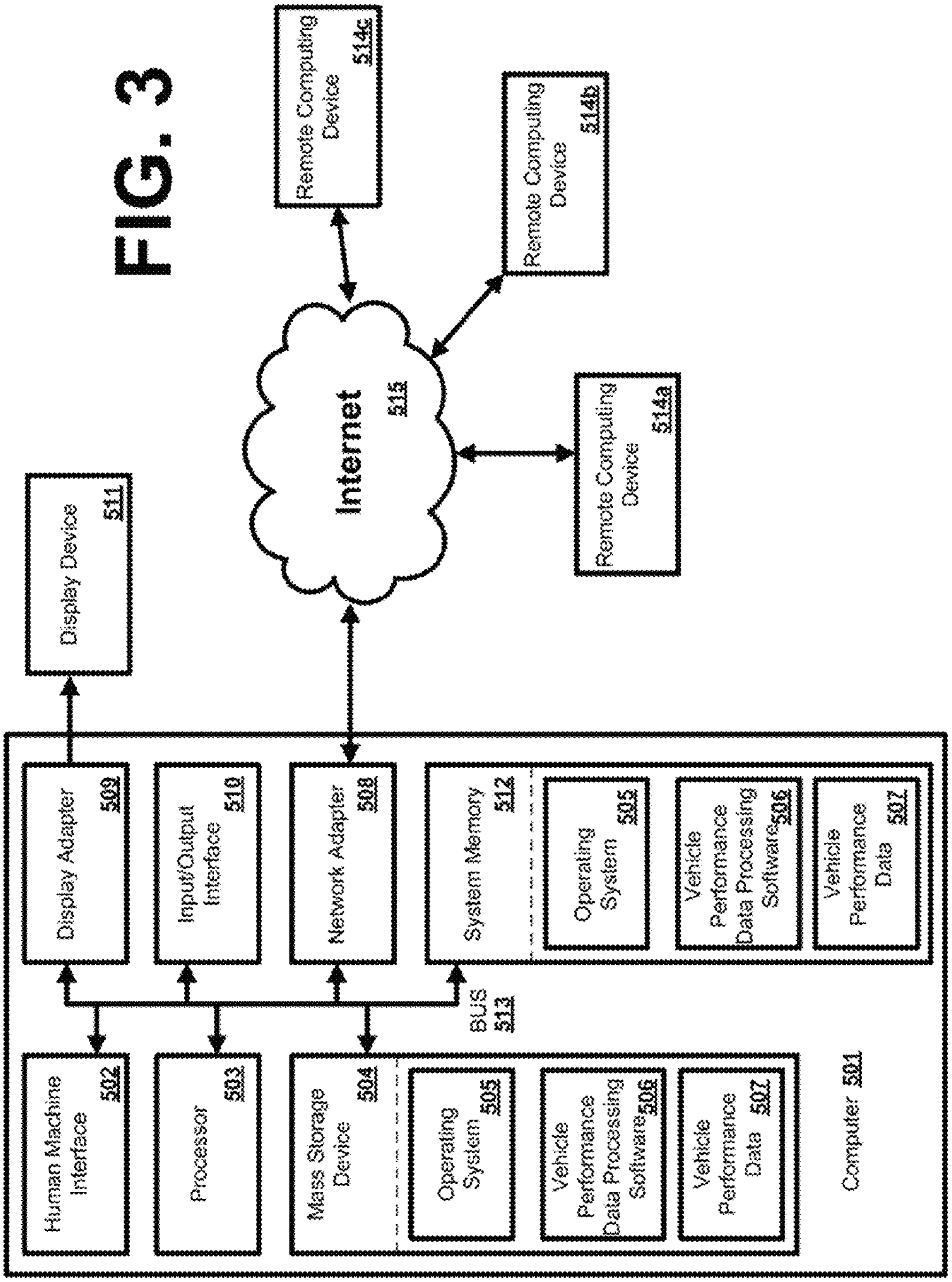
FIG. 3 Illustrates an exemplary operating environment for disclosed methods.

FIG. 3 is a block diagram illustrating an exemplary operating environment for performing the disclosed methods, for example, a server, or other computing device, at a remote host or a central monitoring station. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of computer 501 can comprise, but are not limited to, one or more processors or processing units 503, a system memory 512, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus, Universal Serial Bus (USB), and the like. The bus 513, and all buses specified in this description can also be implemented over a wired or wireless network connection and each of the subsystems, including the processor 503, a mass storage device 504, an operating system 505, navigation software 506, navigation data 507, a network adapter (or communications interface) 508, system memory 512, an Input/Output Interface 510, a display adapter 509, a display device 511, and a human machine interface 502, can be contained within one or more remote computing devices 514*a, b, c* at physically separate locations, connected through buses of this form, in effect implementing a fully distributed system. In one aspect, a remote computing device can be a TCU.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as navigation data 507 and/or program modules such as operating system 505 and navigation software 506 that are immediately accessible to and/or are presently operated on by the processing unit 503. Navigation data 507 can comprise any data generated by, generated for, received from, or sent to TCU 101.

In another aspect, the computer 501 can also comprise other removable/non-removable, volatile/non-volatile computer storage media. By way of example, FIG. 3 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and navigation software 506. Each of the operating system 505 and navigation software 506 (or some combination thereof) can comprise elements of the programming and the navigation software 506. Navigation data 507 can also be stored on the mass storage device 504. Navigation data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a “mouse”), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices 514*a,b,c*. By way of example, a remote computing device can be a personal computer, portable computer, a server, a router, a network computer, a TCU, a PDA, a cellular phone, a "smart" phone, a wireless communications enabled key fob, a peer device or other common network node, and so on. Logical connections between the computer 501 and a remote computing device 514*a,b,c* can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. In one aspect, the remote computing device 514*a,b,c* can be one or more TCUs 101.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of navigation software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

As used herein in the method descriptions that follow, in certain embodiments, "in-vehicle system" can comprise a system that is installed in a vehicle, either at a factory, dealer, or by the user. In other embodiments, "in-vehicle system" can comprise components and systems that can be used outside of a vehicle. In various embodiments, the in-vehicle system can comprise a telematics device, a navigation system, an infotainment system, combinations thereof, and the like. The "remote host" can be a central monitoring station, or other host, that maintains computing and communications systems configured for carrying out the methods.

OBD and OBD II modes can return a bit-map, which may be represented by an array of bytes, that identifies supported diagnostic PIDs ("Parameter Identifiers") that a vehicle, via its various onboard electronic and computer systems, support. For any given vehicle this information never changes. Differences among vehicle characteristics, for example make; model; model year; original options installed at the time of manufacture such as engine and transmission type, etc., make it highly likely that at least slight differences in values representing these parameters from one vehicle to the next will exist. A computer method can detect differences and transform them into a unique identifier when a standard CRC-16 (16-bit Cyclic Redundancy Check) algorithm processes the PID information contained in a composite byte array to arrive at a pseudo VIN or "signature." This application may refer to the composite byte array containing the PID information as a PID map. A pseudo VIN can be used to determine if an aftermarket telematics device is installed on the vehicle it is assigned to, or a vehicle it is not assigned to.

OBD II equipped vehicles support up to 10 Modes (0x01-0x0A) as specified by J1979. OBD II can report the PIDs that various diagnostic modules, as installed in a given vehicle, can support. PIDs may also be available that J1979 does not specify. Each mode, except modes 0x02, 0x03, 0x04, 0x07, 0x08, and 0x0A supports a PID 0x00 request command. Sending PID 0x00 request returns a 4 byte response, with the last bit of the response indicating if the corresponding mode supports additional PIDs beyond those reported in response to the 0x00 PID request—a value of 1 in the final bit position indicates that the mode supports further PIDS while a 0 indicates that the mode does not support more PIDs than returned in response to the request. Some PID requests, which one may also refer to as a PID map request) may return a four-byte response and some may return an eight-byte response if two modules respond to the request. The typical modules that respond to a request are the power train control module ("PCM") and the transmission control module ("TCM"). If only the PCM responds, then a response for a given PID request will be only four bytes. As an example of PID request responses, PID request commands higher than 0x00 include continuation PIDs 0x20, 0x40, 0x60, 0x80, 0xA0, 0xC0, and 0xE0. A return of any of these continuation PIDs in response to a PID request indicates that the particular mode being queried supports PIDs in addition to those contained in earlier responses.

Thus, as an example, a given OBD II system in a typical vehicle may use four modes that each support multiple PIDs. If the OBD II system further supports eight request PIDs (including PID 0x00) for each mode, then 32 potential mode and PID combinations exist. Each mode and PID combination used in a request, which may be referred to herein as a PID request, or a PID map request, typically results in four one-byte values returned in a response message from a particular diagnostic module. Each bit of each of the four one-byte values, which may collectively be referred to herein a PID map, represents whether the vehicle's electronic and computer systems support, and provide information related to, PIDS corresponding to the bits. Four bytes comprises 32 bits. Thus, the response message from a given module in response to a PID request would indicate that the current mode and PID request can support thirty one different PIDs, or information relating to thirty one different parameters, if all the bits of the four bytes are 1 s. A value of 1 in the least significant bit position indicates that the currently-queried mode supports more than the PIDs represented by the other thirty one bits. One can see that this method can result in a very large number of possibilities when each of thirty-two PID requests can result in 31 different values.

Because most cars of a given make and model differ from one another, i.e., individual cars of a given make and model are not identically equipped, sending a PID request typically results in various systems and computer devices returning a response of bits in a response message, also referred to as a PID map, that is unique to the vehicle. Although perhaps not 100% unique, a PID map may suffice as a basis for a substitute for a VIN for vehicles that do not provide a VIN via a diagnostic port, such as OBD, or OBD-II, or by other means of accessing the vehicle's onboard computer bus. Thus, a PID map, or a result of an algorithm processing the PID map bits, may be referred to as a pseudo-VIN. Examples of the processing algorithm include a CRC algorithm, a hashing function, or other similar algorithm that processes an input value and returns a result that has the same size (i.e., same number of bits, or bytes) regardless of the input value. Furthermore, the process always returns the same result for a given input.

When a telematics control unit 101 coupled to a diagnostic port, such as an OBD, or OBD-II port in a vehicle 201 is booted for the first time, it requests PIDs from the vehicle's computer bus, and then stores the returned PID map in a memory. Alternatively, TCU 101 can transmit the PID map to a telematics services provider's central server 202 over a communication network 205 via a wireless link represented by the wireless transceiver antenna 204. Then, either a processor in TCU 101, or a processor at server 202, generates an initial pseudo VIN by processing the PID map bits into a value of predetermined length, and stores the pseudo VIN to a memory.

At each successive boot up, TCU 101 transmits a PID request on the computer bus. Following the same process used at initial boot-up, TCU 101, or server 202, processes the PID map received from the vehicle's bus into a current pseudo-VIN, and compares the current pseudo-VIN with the initial pseudo-VIN. If the current pseudo-VIN does not match the stored initial pseudo-VIN, TCU 101 may assume, for example, that TCU 101 may have been swapped to a different vehicle, and wirelessly transmits a notification to a telematics service provider 210, and its server 202, of the mismatch. Telematics services provider 210 then may forward the mismatch information to another entity, such as an original equipment manufacturer that built vehicle 201, an insurance company, a roadside assistance company, or other entity that may sponsor use of TCU 101 in vehicle 201.

Newer CAN-based vehicles may provide a response to a PID request from one, or both, of two modules: PCM and TCM. In the event a vehicle OBD II port provides a response from both modules, the 4 TCM bytes are preferably concatenated to the right of the 4 PCM bytes. For example:

PCM bytes- E5 F6 8A 90
TCM bytes- 09 78 6F 67
Result - E5 F6 8A 90 09 78 6F 67

As each request returns 4 bytes of information describing which PIDs the current mode being queried supports, the four bytes are concatenated onto the right side of the accumulation of previously concatenated bytes according to a prioritization scheme, as discussed in more detail below. For example:

Accumulated bytes thus far as shown above - E5 F6 8A 90 09 78 6F 67
Bytes to be added- 72 A9 1B 8F
Next set of Bytes to be added - 98 7D EC 4A
Result- E5 F6 8A 90 09 78 6F 67 98 7D EC 4A 72 A9 1B 8F The PID map may be conditioned before storing to memory. For example, a CRC, or hash routine process, may be performed on the bits returned in the PID MAP. As discussed above, TCU 101 or server 202, would perform the same process on the PID map returned at initial boot as well as on each successive boot up. Thus, performing a CRC, hash, or similar process allows TCU 101, or server 202, to avoid storing a long string comprising a variable number of bits. One skilled in the art will appreciate that a method for generating a pseudo-VIN may be implemented in software, or hardware, in a vehicle's TCU, or at a computer device remote from the location of the vehicle associated with the TCU.

A preferred method for identifying a vehicle, or other asset, based on its equipment configuration stores bytes returned from the PCM first and concatenates bytes returned from the TCM thereto. The example above shows two groups of data received in response to a PID request, PID map request. For purposes of example, we assume that the PCM returned the sequence 98 7D EC 4A and the TCM returned the sequence 72 A9 1B 8F. However, assuming that the method received sequence 72 A9 1B 8F first, the method prioritizes the later-received group of four bytes and concatenates accordingly so that the sequence 98 7D EC 4A comes before 72 A9 1B 8F. After a predetermined sample period elapses following sending of the request, the method times out and assumes it has received all PID responses for the currently queried mode. An services provider operator, such as for an OEM, or a telematics services provider, may set the sample period at 0.500 mS, but may use other sample periods. After the sample period expires, a PID count increments and the method begins again for the currently selected mode. After all the PIDs have been requested for a given mode, a mode counter increments and the method repeats for all the PIDS for the mode. The method continues until all of the PIDs for all of the modes that can be queried have been queried.

Regarding prioritization, the method could also store and concatenate four-byte groups in the reverse order so that higher value four-byte-groups get concatenated after lower value four-byte-groups received in the response to the same PID request. The method should, however, use criteria to ensure that it stores and concatenates bytes returned from given modules in the same order every time it executes, including upon initial boot up and subsequent boot-up occasions. As illustrated in the second part of the example given above, a PCM in a particular vehicle may be busy at one instance the method executes and the TCM returns its response first. At another time (for example, twenty four hours later) the PCM w might be lightly loaded and return its response first. Thus, since the PCM typically returns a higher number (indicating more supported PIDS) in a response, the method can wait until it receives two responses and then store the one of highest value first and then concatenate the second. Alternatively, the method could analyze header information of the four-byte groups in a response to determine whether the PCM or the TCM sent the given group of bytes. Ensuring that the order of storing and concatenating is the same every time the method executes ensures that processing by a CRC algorithm, hash algorithm, or any other algorithm the method uses to process the PID maps, will return the same result every time for a particular vehicle configuration.

Once all possible mode and PID combinations have been returned during the predetermined sample period, stored, and concatenated together, the final composite result (the prioritized bits from all the PID requests that have been concatenated together) passes to an algorithm, preferably a 16 bit Cyclic Redundancy Check (CRC) algorithm, which processes the bits of the composite result.

As an example, a sample PID readout report from a 2008 Toyota Avalon below shows the values returned in response to PID requests. The first column represents mode identifiers, the second column represents PID map request codes, and the byte values that may follow represent the PIDs that are available for the corresponding mode and PID—these byte values returned in response to the mode and PID request correspond to the associated PID and mode illustrated on the same line in the sample readout. A processor at TCU 101, or server 210, combines the PID map byte values for the mode and PID combinations that return a byte values into a resulting composite value. The composite result value is passed to an algorithm for processing. In the preferred embodiment, a CRC algorithm processes the array.

TABLE 1

| |
|---|
| 01 00: BF 9F A8 93 98 18 80 13 |
| 01 20: 91 05 B1 1F 80 01 80 01 |
| 01 40: FA DC 20 00 C0 0C 00 00 |
| 01 60: |
| 01 80: |
| 01 A0: |
| 01 C0: |
| 01 E0: |
| 05 00: |
| 05 20: |
| 05 40: |
| 05 60: |
| 05 80: |
| 05 A0: |
| 05 C0: |
| 05 E0: |
| 06 00: CC 00 00 01 |
| 06 20: C0 00 00 09 |
| 06 40: 44 00 00 01 |
| 06 60: 00 00 00 01 |
| 06 80: 00 00 00 01 |
| 06 A0: FE 00 00 00 |
| 06 C0: |
| 06 E0: |
| 09 00: FF 00 00 00 3F 00 00 00 |
| 09 20: |
| 09 40: |
| 09 60: |
| 09 80: |
| 09 A0: |
| 09 C0: |
| 09 E0: |
| Pseudo VIN Binary Code: 1010110011110011 |
| Pseudo VIN HEX Code: ACF3 |

Thus, the following fifty-six byte composite result of combining the values returned in response to mode and PID requests shown in the readout of Table 1 passes to a CRC algorithm:

| |
|---|
| BF 9F A8 93 98 18 80 13 91 05 B1 1F 80 01 80 01 FA DC 20 00 C0 0C 00 00 CC 00 00 01 C0 00 00 09 44 00 00 01 00 00 00 01 00 00 00 01 FE 00 00 00 FF 00 00 00 3F 00 00 00 |

For a given process, or algorithm, such as a CRC algorithm (a hash routine, or similar could also be used) the result of processing the composite result with the CRC algorithm is: AC F3

Thus, the result of generating an identifier for a 2008 Toyota Avalon equipped a certain way according to the example would be AC F3.

Figure 4:
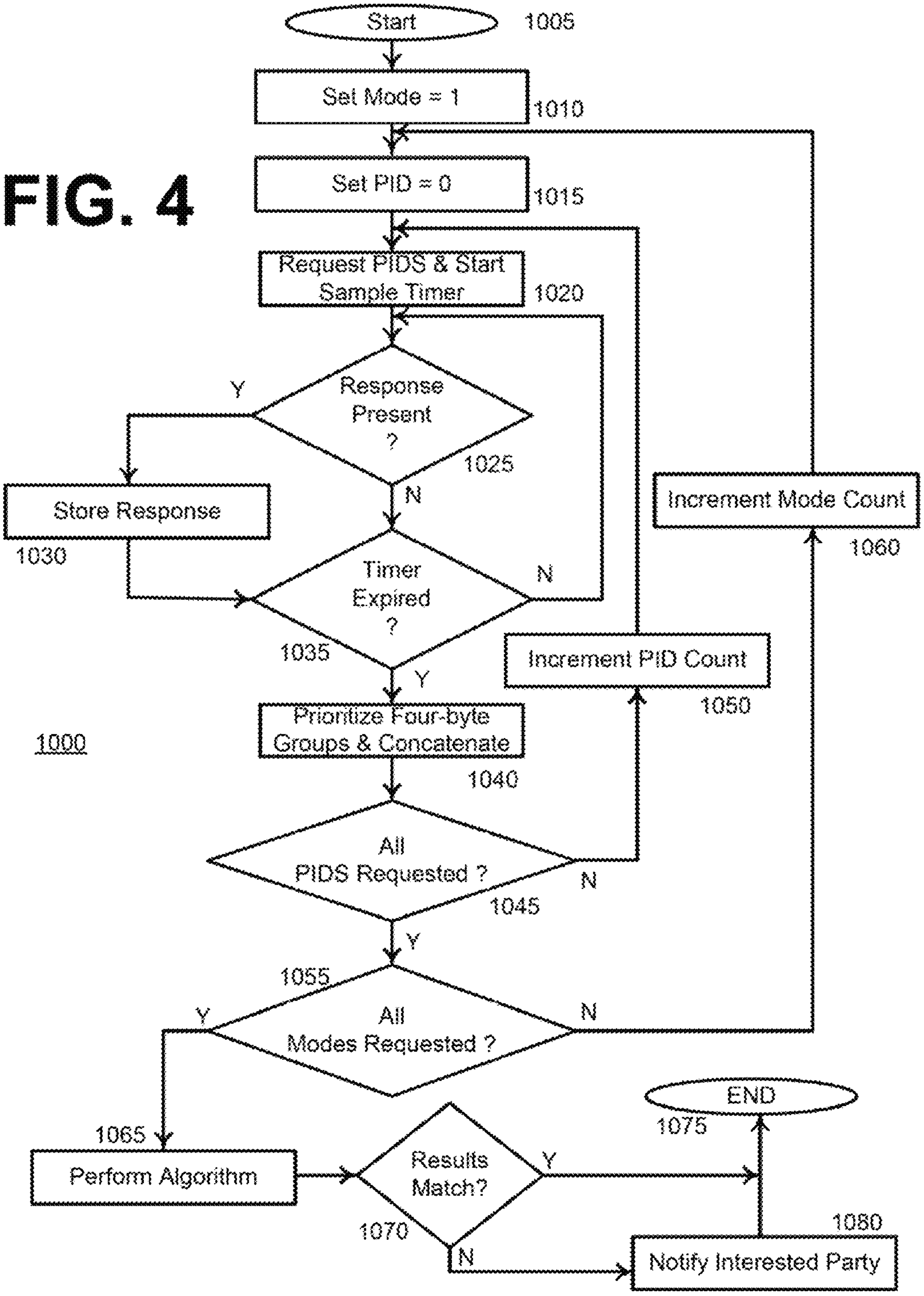
FIG. 4 illustrates a flow diagram for a method for generating and using pseudo-VINs to ensure a TCU is used in a vehicle associated with it.

FIG. 4 illustrates a flow diagram for a method 1000 for determining a unique identifier, or a pseudo-VIN, for a vehicle. Method 1000 starts at step 1005. At step 1010, method 1000 uses either a prestored value, or a user input, to initialize a mode variable used in a request for PIDs for the mode corresponding to the value stored in the mode variable. At step 1015, method 1000 uses either a prestored value, or a user input, to initialize a PID variable used in a request for PIDs, or PID map request, for the mode corresponding to the value currently stored in the mode variable and the PID corresponding to the value stored in the PID variable. At step 1020, a TCU transmits a PID map request, typically over a diagnostics or general vehicle communication bus, to vehicle devices, such as diagnostics modules and control modules.

A sample timer begins counting down based on a predetermined value, either prestored, or entered by a user. The value used for the PID map request is a combination of the values currently stored in the mode variable and PID variable. The sample timer value can be any value, but typically method 1000 uses a value of approximately 0.500 mS.

At step 1025 method 1000 determines whether a reply has been returned in response to the PID map request. If yes, method 1000 stores the returned results at step 1030 and then the method determines at step 1035 whether the sample timer has counted down or not.

If method 1000 determines at step 1025 that a response has not been received, the method advances to step 1035.

Continuing with discussion of step 1035, if method 1000 determines that the sample timer has not counted down yet, the method returns to 1025 and continues as discussed above.

As an example of a scenario that could occur, the method may determine at step 1025 that a response message in the form of a PID map has been received from, for example, a vehicle's engine control module. Thus, the method would follow the 'Y' branch from step 1025. However, the method would still loop back after step 1035 if the timer had not expired in case another high level module, such as the transmission control module, also has sent a reply in the form of a PID map.

If method 1000 determines at step 1035 that the sample timer has expired, the method proceeds to step 1040, where the typically four-byte groups of values returned in response to the previous PID request are stored and concatenated. The storing and concatenation step includes prioritizing the four-byte groups preferably according to their sum. In other words, method 1000 calculates a prioritization sum by adding the values of each byte of a four byte group together. Typically during a sample period, the PCM and TCM each send a four-byte group of numbers indicating the numbers of PIDs the vehicles onboard diagnostic and control system supports for the mode and PID contained in the PID request. Thus, the higher the values of the numbers of the PCM's four-byte response, the more PIDs supported for the mode and PID combination sent in the corresponding request. Typically, the PCM supports more PIDs for a given mode than the TCM. Thus, ordering the two four-byte groups of numbers received during each sample period according to the prioritization sum results in a repeatable final result when method 1000 executes. If method 1000 did not perform such ordering, method 1000 could produce different results from iteration to iteration if the PCM and TCM respond to a given PID request in reverse order than in response to another PID request for the same mode and PID combination.

Continuing with the description of step 1040, after method 1000 processes the four-byte groups from the PCM and TCM by prioritizing them according to their respective prioritization sums, the method concatenates the bytes of the ordered four-byte groups to a byte array of previously processed four-byte groups. When performing step 1040 for request mode 01 hex, PID 00 hex, method 1000 stores the processed bytes of the four-byte groups and proceeds to step 1045.

At step 1045, method 1000 determines whether all PID requests for a given mode have been requested. In other words, method 1000 determines whether the currently set PID request contains a value other than 0xE0. If not, method 1000 advances and increments the request value stored in the PID variable at step 1050 to the next higher value in the list of PID requests 0x20, 0x40, 0x60, 0x80, 0xA0, 0xC0, 0xE0. Method 1000 then returns to step 1020 and performs the steps that follow according to the description given above.

If method 1000 determines at step 1045 that the currently set PID value is 0xE0, the method advances to step 1055 and determine whether the current value set in the mode variable is 10. If the currently stored mode value is not 10, then method 1000 advances and increments the mode request value stored in the mode variable at step 1060 to the next highest value in the list of mode value 5, 6 and 9. Since modes 2, 3, 4, 7, 8 and 10 currently do not support returning PID maps in response to PID map requests, step 1060 preferably does not set the mode value to either of these modes. After performing step 1060, method 1000 returns to, and continues from, step 1015 and performs the steps that follow as described above.

If method 1000 determines at step 1055 that PID map requests for all modes have been requested during preceding steps, at step 1065 the method processes the resultant composite byte array from the most recent performance of step 1040 according to an algorithm that produces a value of a predetermined length, typically two bytes, or possibly three, as described below. A CRC algorithm is preferred for use as the algorithm of step 1065 due to ease in writing, or obtaining, software (other algorithms can also be used however), and an example of a preferred CRC algorithm is described below. The pseudo-VIN resulting from the processing algorithm may be stored for future use, compared to a previously stored pseudo-VIN resulting from an iteration performed at a previous boot-up of a TCU, or transmitted to a central server for comparison to a previously stored value corresponding to a particular user and their vehicle. At step 1070, a comparison is made to a previously stored pseudo-VIN from a previous iteration (typically the initial iteration that occurs when a TCU is first booted). If the result of the comparison indicates the current pseudo-VIN matches the previously stored pseudo-VIN, method 1000 ends at step 1075. However, if the current and previously stored pseudo-VINs, method 1000 advances to step 1080. At step 1080, method 1000 generates a notification to an interested third party that the pseudo-VINs do not match. Preferable, an initial iteration of method 1000 occurs when a TCU is first installed and booted up in a vehicle. Each iteration after the initial iteration may be referred to as a subsequent iteration. One skilled in the art will appreciate that a given TCU can perform either the initial iteration of method 1000 upon its first bootup, a subsequent iteration at a subsequent bootup of itself, or both. Similarly, a server remote from a given TCU can perform either the initial iteration upon a TCU's first bootup, a subsequent iteration upon subsequent bootup of the TCU, or both.

As an example of a comparison and notice at steps 1070 and 1080, a third party (represented by provider 210 in FIG. 2) such as a road side assistance company, an insurance company, or a telematics services provider, may provide portable telematics control units that plug in to a vehicle's diagnostic port. These interested parties (interested in the sense that they provide the TCU devices to provide services, or to reduce insurance premiums, for example) desire to ensure that a given TCU device that they associate with a particular vehicle, and thus a particular customer, physically couples with the associated vehicle and not with a different vehicle. So, upon initial boot of a given TCU device, the TCU, or a server, performs the steps of method 1000 and stores the derived pseudo-VIN to a memory as an initial representative result, or an initial pseudo VIN. Upon each subsequent boot-up of the TCU device, the corresponding subsequent representative result, or subsequent pseudo-VIN, that results from performing method 1000 should match the initial pseudo-VIN if the TCU is plugged in to the diagnostic port of the same vehicle during the initial boot up and subsequent boot ups. Thus, an interested third party may want to know when the comparison of the initial pseudo-VIN and the subsequent pseudo-VIN at step 1070 does not result in a match. In addition, the interested third party may be interested in knowing that the pseudo-VIN from a subsequent iteration performed at each corresponding subsequent boot up of a TCU matches the pseudo-VIN from the initial boot up of the TCU.

An interested party may wish to be apprised of a mismatch for a variety of reasons. For example, a mismatch may indicate that a user has swapped TCU devices between vehicles, or that a device, or system coupled to the vehicle's communication bus may have failed.

An insurance company may wish to know that a mismatch has occurred to prevent fraud. If an insurance company reduces insurance rates for an eighteen-year-old driver, the company wants to make sure that the TCU device is coupled to a car the young driver drivers rather than to the car driven by his grandfather. The grandfather will probably drive more cautiously than the young grandson. If data from a car driven by the grandfather is passed off as data from a car driven by the grandson, the grandson may wrongly obtain a reduction in insurance rates based on passing off the cautious and infrequent driving of his grandfather as his own. Thus, since any PID maps returned in response to a PID request should not change for a given car over the life of the car, comparing an initial pseudo-VIN to a subsequent pseudo-VIN ensures that an insured driver uses a given TCU device in a car the insurance company has associated with him.

A roadside assistance services provider has an interest in ensuring that a customer uses a given TCU in the car that the services provider has associated with the user. For example, if a customer pays for roadside assistance, and a thief steals a TCU from the customer, the roadside services provider would want to know if the TCU is used in a car other than the customer's car so that it would not dispatch, or otherwise provide, roadside assistance to the thief, or other unauthorized driver. In an alternative embodiment, the roadside assistance services provider may wish to a sell a 'family plan', or multi-car plan. For a higher subscription rate, the interested party could permit a customer to use a single TCU in multiple vehicles. In such a scenario, multiple boot-ups could be designated as 'initial' boot ups, and the TCU 101, or server 210, could store multiple 'initial' pseudo VINs corresponding to the multiple cars the customer has paid for. Thus, as long as a subsequent pseudo code matched one of the initial pseudo codes at step 1070, process 1000 would continue to step 1075 without sending an alert, or notification, to the services provider that the TCU is being used in a different vehicle than the one corresponding to the very first boot up of the TCU.

A telematics services provider may have a contract with an insurance company or roadside assistance company to provide these ultimate interested third parties with a notification of a mismatch. Thus, the telematics services provider, represented by 210, may perform a data collection and data forwarding function for an ultimate interested third party.

Figure 5:
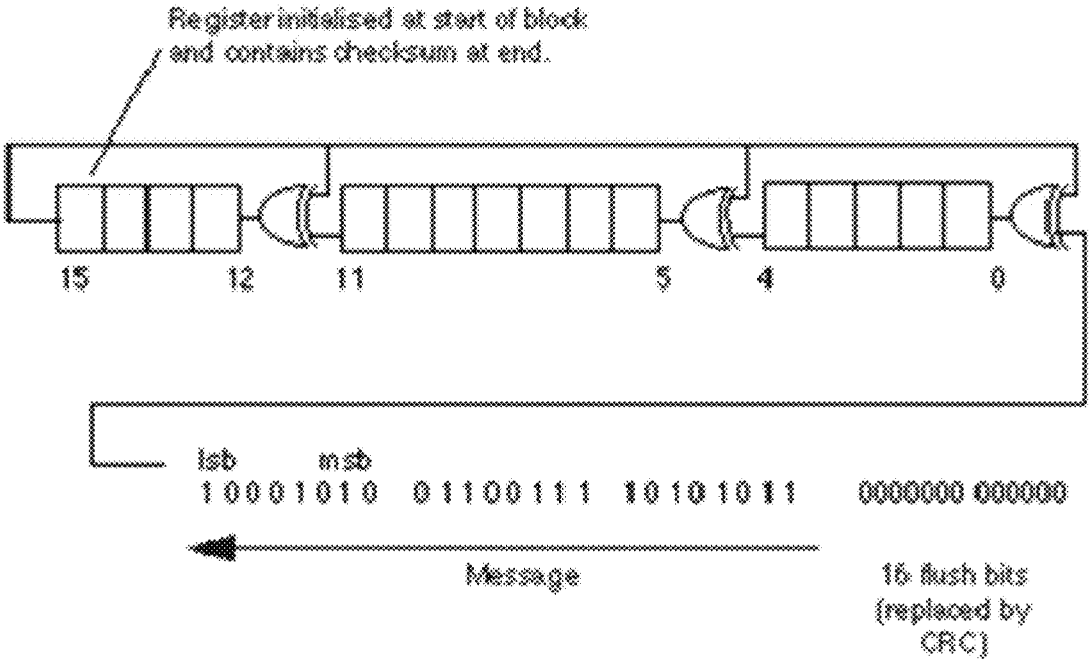
FIG. 5 illustrates an example of a 16-bit CRC algorithm.

FIG. 5 illustrates an example of a CRC algorithm, which is a form of a hash algorithm. Although a graphical example of a 16-bit CRC algorithm is given below; it will be appreciated that algorithms other than a 16-bit CRC algorithm may be used to process the byte array, or pseudo-VIN, that results from performing steps 1005-1065 of method 1000 as described above. The main function of the algorithm is to process at step 1065 the byte array that represents the unique combination of the various PIDs that a vehicle's diagnostic system supports and convert the array into a resultant value that has a very high likelihood of being unique compared to the resultant value that the same algorithm would produce if performed for the byte array representing PIDs that another vehicle supports.

In the 16 BIT Cyclic Redundancy Check (CRC) algorithm result shown in FIG. 5, the first byte passed into the CRC is the first byte of the composite result. The CRC typically performs the following steps:

1. The 16 bit CRC starts with a zero in each of sixteen positions of a processing register.
2. The CRC algorithm shifts each bit to the left.
3. The new bit 12 results from the left-shifting of the 11th bit and performing an exclusive OR operation with it and the previous bit 15 that was shifted out.
4. The new bit 5 results from the left shifting of 4 bit and performing an exclusive OR operation with it and the previous bit 15 that was shifted out.
5. The new bit 0 results from the incoming bit and performing an exclusive OR operation with it and the previous bit 15 that was shifted out.
6. The CRC algorithm repeats steps 2 through 5 until all bits from the composite result have been processed.

Processing the composite result repeatedly yields a repeatable and reliable two-byte identifier practically unique to each vehicle of a group of vehicles in which a third party services provider, or insurance company, is like to have an interest in. In addition, a third byte may be appended, or concatenated, with the two-byte result to give a three-byte identifier. The third byte may represent the number of non-zero bytes returned in response to the PID requests. Concatenating this third byte with the result of the algorithm performed at step 1065 of method 1000 as shown in FIG. 4 provides an increased level of uniqueness. One skilled in the art will appreciate that other forms of similar functions (e.g., hash algorithms) can be used in step 1065 to process input data that can vary in size into a result of a given size that uniquely represents the input data.

The processing of the disclosed methods and systems can be performed by software components. The disclosed system and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising a server configured to communicate with a telematics control unit, wherein the telematics control unit is configured to perform a method for identifying a vehicle based on equipment installed on it, the method comprising: receiving bits, generated by one, or more, of a plurality of devices installed on the vehicle, in response to a PID map request; processing the received bits according to an algorithm that transforms the received bits into a result representative of the bits received in response to the PID map request; and storing the representative result from the algorithm to a memory.

2. The system of claim 1 wherein the telematics control unit is further configured to perform the step of using the stored representative result from the algorithm as a basis for determining the identity of the vehicle.

3. The system of claim 1 wherein the telematics control unit is further configured to perform the steps of comparing the representative result from a subsequent iteration to the representative result from an initial iteration of the method and determining that the same vehicle's device, or devices, that generated the bits received in the subsequent iteration did not generate the bits in the initial iteration if the representative results from the initial and subsequent iterations do not match.

4. The system of claim 3 wherein the telematics control unit is further configured to perform the step of notifying an interested party if the same vehicle's device, or devices, that generated the subsequent representative result did not generate the initial representative result.

5. The system of claim 1 wherein the vehicle identified by the initial iteration is owned, or operated, by a customer of the interested party.

6. The system of claim 3 wherein the telematics control unit is further configured to perform the step of notifying an interested party if the same vehicle's device that generated the subsequent representative result also generated the initial representative result.

7. The system of claim 3 wherein the telematics control unit is further configured to perform the step of disabling itself if the representative results from the initial and subsequent iterations do not match.

8. A server configured to communicate with a telematics control unit, the server configured to perform a method for identifying a vehicle based on equipment installed on it, the method comprising: receiving bits, generated by one, or more, of a plurality of devices installed on the vehicle, in response to a PID map request; processing the received bits according to an algorithm that transforms the received bits into a result representative of the bits received in response to the PID map request; and storing the representative result from the algorithm to at memory.

9. The server of claim 8 further configured to perform the step of using the stored representative result from the algorithm as a basis for determining the identity of the vehicle.

10. The server of claim 8 further configured to perform the steps of comparing the representative result from a subsequent iteration to the representative result from an initial iteration of the method and determining that the same vehicle's device, or devices, that generated the bits received in the subsequent iteration did not generate the bits in the initial iteration if the representative results from the initial and subsequent iterations do not match.

11. The server of claim 10 further configured to perform the step of notifying an interested party if the same vehicles device, or devices, that generated the subsequent representative result did not generate the initial representative result.

12. The server of claim 8 wherein the vehicle identified by the initial iteration is owned, or operated, by a customer of the interested party.

13. The server of claim 10 further configured to perform the step of notifying an interested party if the same vehicle's device, or devices, that generated the subsequent representative result also generated the initial representative result.

14. The server of claim 10 further configured to perform the step of disabling a telematics control unit of the vehicle that generated the subsequent iteration if the representative results from the initial and subsequent iterations do not match.

* * * * *